July 25, 1972     H. TRAMPOSCH     3,679,448
CREDIT CARD AND METHOD OF LUMINESCENT PRINTING
Filed July 27, 1970
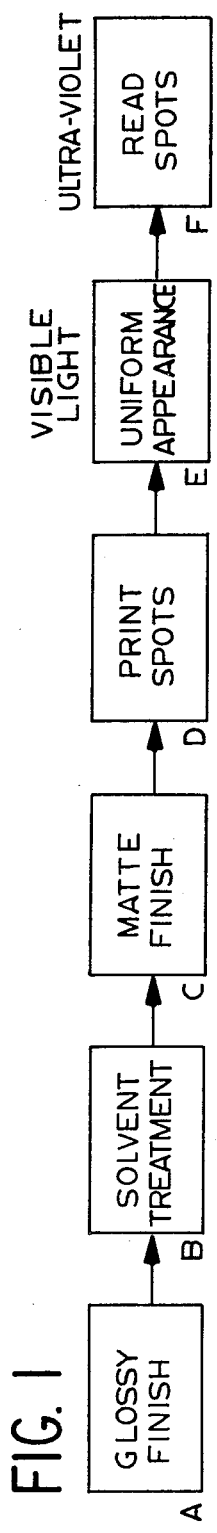
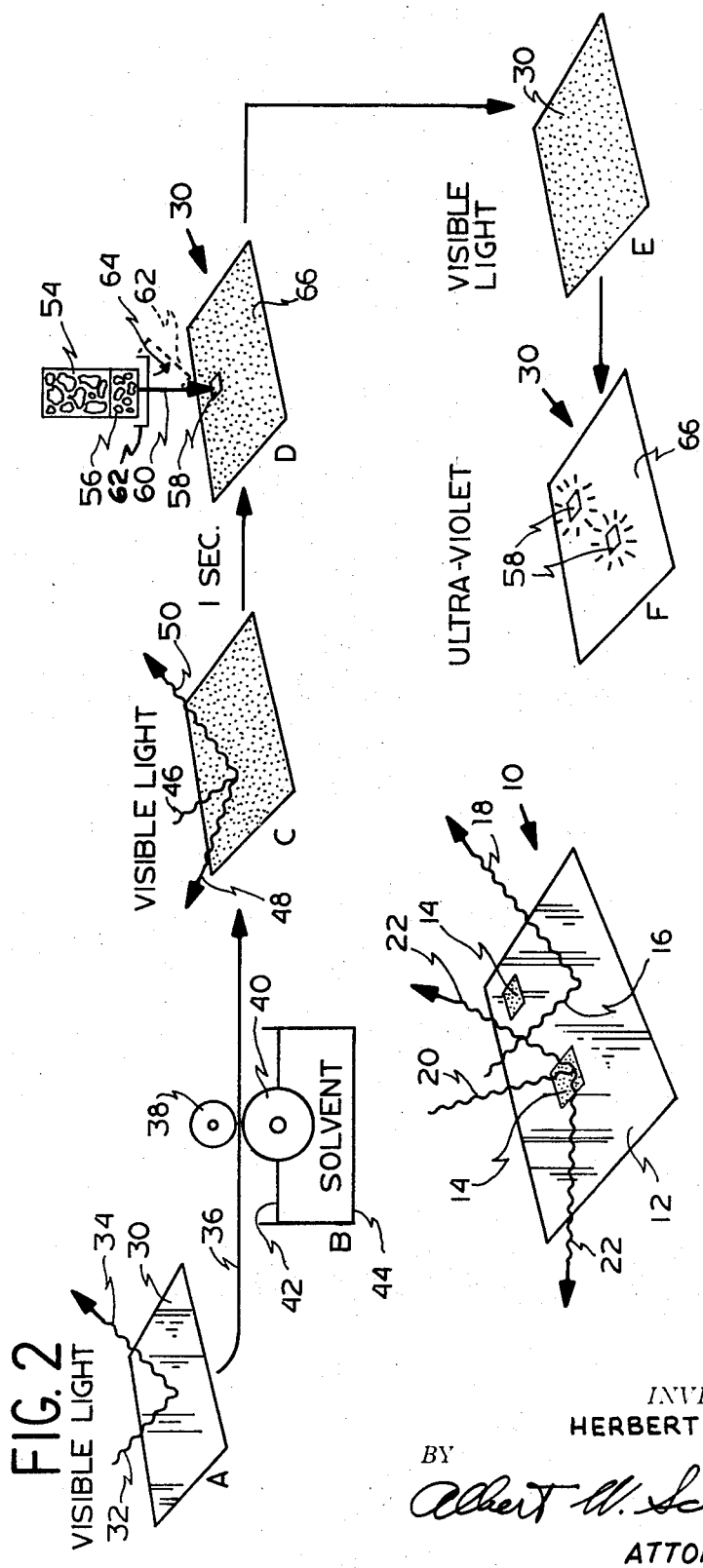
INVENTOR.
HERBERT TRAMPOSCH
BY
Albert W. Scribner
ATTORNEY

United States Patent Office 3,679,448
Patented July 25, 1972

3,679,448
CREDIT CARD AND METHOD OF LUMINESCENT PRINTING
Herbert Tramposch, Riverside, Conn., assignor to Pitney-Bowes, Inc., Stamford, Conn.
Filed July 27, 1970, Ser. No. 58,486
Int. Cl. B41m 3/14; B44d 1/44
U.S. Cl. 117—1
1 Claim

ABSTRACT OF THE DISCLOSURE

A plastic credit card is to be imprinted with a luminescent spot code readable under ultra-violet radiation for use in verification of the subscriber's account. The luminescent marker material employed for this purpose is borne in a solvent which attacks the material of the credit card, producing a surface etching effect which is visible under ordinary light. To avoid betraying the existence and locations of the luminescent spots in this manner, the card is treated, prior to luminescent printing, with a solvent material to produce a similar etching effect over an entire background area. The locations where printing subsequently takes place are then indistinguishable from the background under visible light.

FIELD OF THE INVENTION

This invention relates to coded plastic credit cards, and a method of applying a luminescent spot coding to such cards in a manner which renders the spots indistinguishable from the surrounding background area of the card under visible light.

THE PRIOR ART

Credit cards are of major importance as a medium of exchange in our economy. The type of card most commonly used for this purpose is a wallet-sized rectangle formed of glossy-surfaced plastic material, such as polyvinyl chloride (referred to as PVC). The use of credit cards has brought with it certain problems, however, relating to the fact that the cards are sometimes lost, stolen, counterfeited, or misdirected in the mails, or they may be cancelled and not returned by the former subscriber. In addition, there are occasions when even legitimate cards should not be honored for particular purchases because of the subscriber's account is temporarily delinquent, or because the amount of the purchase would put the account balance over its authorized limits.

In order to reduce the economic losses which result from such situations, various methods of credit card verification have been developed. They range from manually checking a credit card identification number against a list of numbers which are not in good standing for one reason or another, to sophisticated electronic equipment which automatically reads coded information recorded on the credit card, and transmits that information to a computer which checks it against a list and promptly returns an answer as to whether the card is or is not acceptable. Card reading devices of this kind employ various types of encoding schemes, including embossed bars, magnetic spots embedded within the material of the card, and various types of printed spot codes which are read by photo-electric means. Of all these techniques, the one which appears to be most reliable, and most resistant to tampering by wrongdoers, is a luminescent spot code which is read photo-electrically. One of the principal advantages of this approach is that the spots can be read reliably under an ultraviolet lamp, but theoretically they are undetectable by ordinary visual inspection when the sole source of illumination is light in the visible range of the spectrum.

The preferred way of printing such luminescent spots on a plastic credit card is to dissolve a luminescent marker material in a liquid solvent, for wet application to the surface of the card. The liquid which serves as the solvent for the luminescent marker material is also a solvent for the PVC or other plastic credit card material, so that the marker material is impregnated into the card to some depth below the surface. Consequently, it is difficult for anyone to tamper with the card by removing the marker material, without also grinding away a surface layer of card material. The effects of such grinding would be more or less noticeable, depending on the depth of penetration of the luminescent marker material.

This technique, however, has a side effect which in one respect adversely affects the security of the credit card system. Specifically, when the marker solvent attacks the surface of the plastic credit card, it etches it visibly, leaving each luminescent-printed spot with a dull, matte finish. The surface of the plastic card at all other locations normally has a more highly reflective finish; or even a glossy, smoothly polished finish which reflects visible light in a fairly specular fashion; while the matte finish spots reflect visible light quite diffusely. This makes them stand out visibly against the more reflective background, especially when the credit card is held at certain oblique illumination angles. This effects permits wrongdoers to identify which credit cards are protected by a luminescent spot code system, and even permits them to identify which specific spots or code bits have been imprinted on the surface of a particular card. Such information makes it somewhat easier for the wrongdoer to alter a luminescent spot-coded credit card, or at least to avoid using such a credit card in any establishment which he knows is equipped with an ultra-violet credit card reader.

THE INVENTION

In order to prevent the luminescent-printed bits of such a spot code from being visually distinguishable, under ordinary visible light, from the surrounding background area of the card, the present invention contemplates that the background area shall be similar in visual appearance to the luminescent-printed bit areas as seen under ordinary visible light. Specifically, a selected area on the card, which may comprise both background areas and those areas which are ultimately to be imprinted with luminescent spots, has a uniformly diffuse reflection characteristic. (In a co-pending patent application there is disclosed and claimed the concept of uniformly specular reflection). The uniformly diffuse reflection is achieved by treating the selected area, either by mechanical or chemical means, so that the card surface is sufficiently roughened to match the diffuse reflection characteristic ultimately produced in the printed areas. The best way of accomplishing this is to etch both the background areas and the intended print areas with a volatile solvent which dries quickly. Then as soon as drying has advanced sufficiently, the printing step is performed in selected portions of the treated area. Etching then takes place again in the printed areas, but this does not visibly distinguish the printed areas from the background areas which were etched previously.

BRIEF DESCRIPTION OF THE DRAWINGS

FIG. 1 is a process flow chart indicating successive steps A through F in a luminescent spot printing process according to this invention.

FIGS. 2A through 2F are a series of sequential views, perspective and diagrammatic respectively, illustrating the physical aspects of steps A through F respectively of FIG. 1.

And FIG. 3 is a perspective view illustrating, for the sake of comparison, the appearance of a luminescent spot-coded credit card which has not been prepared in accordance with this invention.

The same reference numerals refer to the same elements throughout the several views of the drawing.

DETAILED DESCRIPTION OF THE PREFERRED EMBODIMENT

This patent application is concerned with a method of luminescent spot printing which starts with a conventional credit card (FIG. 1A) made of a plastic material such as PVC. The production processes normally used for cards of this type leave it with a highly polished surface, which results in a substantially specular reflection characteristic, giving the card a shiny appearance, particularly as seen by obliquely reflected light. In accordance with this invention, such a card is first pre-treated with a liquid solvent (FIG. 1B) which attacks and etches the surface thereof, thus producing a matte finish (FIG. 1C) over the background areas. In other words, the surface of the card is deliberately roughened so that its visible light reflectivity takes on a diffuse characteristic, as opposed to the specular character which it had initially.

The next step of the process (FIG. 1D) is to print luminescent marker material at selected locations on the surface of the card, to produce a spot code representing a credit card identification number. This produces local solvent etching at the printed spots, because the luminescent marker material is borne in a liquid vehicle which is also a solvent for PVC or whatever plastic material is used in the credit card. Such local etching gives the printed spots a matte finish, which would make them stand out by contrast to a glossy finish in the surrounding background area.

See, for example, FIG. 3 which shows a plastic credit card 10 having a glossy background area 12 surrounding a plurality of luminescent-printed code spots 14. The principal advantage of using a luminescent spot code resides in the fact that the spots 14 are not supposed to be detectable by observation under ordinary visible light, since the luminescent marker material conventionally employed for this purpose is colorless. Under ultra-violet illumination, however, it luminesces brightly, and thus is readily detectable by the human eye or by automatic photoelectric sensing equipment of the type employed in credit card verifying devices.

But because of the local etching effect, in the prior art diagram of FIG. 3, the coded spots 14 can be detected even under ordinary visible light. An incident ray 16 of visible light, striking the glossy background area 12, is reflected substantially along a single path 18, i.e. a specular manner. On the other hand, another ray of incident light 20, which happens to strike one of the code spots 14 having an etched or matte finish, is reflected diffusely along a plurality of different paths 22. This difference in reflection characteristics permits the coded spots 14 to be distinguished from the glossy background area 12 with only visible light for illumination, particularly if the credit card 10 is held at certain oblique angles to the incident light. Consequently, one who is tempted to make unauthorized use of such a credit card would be apprised of the fact that the card is protected by a luminescent spot code, and may take steps to avoid entering an establishment which is equipped with a luminescent spot code verifier device. Worse yet, one who wishes to alter spot coding on such a credit card, will find that such alteration is made somewhat easier by the fact that he can, even under visible light, determine precisely which areas 14 are already printed with luminescent spots, and which areas 12 are not so printed.

The process of this invention, however, by imparting an overall matte finish to the background areas, makes them indistinguishable from those areas which are subsequently etched in the course of being imprinted with luminescent code spots. Thus, although spot printing step D in FIG. 1 produces local etching, it does not thereby render the spots visually distinguishable from the surrounding background area, which is also etched.

The result, indicated in FIG. 1E, is that under visible light the luminescent-printed credit card has a uniform visual appearance; specifically, it has a matte finish over the printed spots and background area alike. Nevertheless, when viewed under ultra-violet light as indicated in FIG. 1F, the luminescent-printed spots stand out against the background areas by virtue of their luminescence.

FIGS. 2A through 2F illustrate the physical characteristics of the steps of FIG. 1A through 1F respectively. FIG. 2A, for example, shows an unprinted PVC plastic credit card 30 having a uniformly glossy surface which reflects an incident ray 32 along a single path 34, i.e. in specular fashion. In its broadest form, the invention contemplates that all, or at least that part of the surface area of the underside of credit card 30 which constitutes a background area in relation to the luminescent spots to be printed thereon, shall be roughened in some appropriate manner (e.g. by mechanical abrasion or solvent etching) and at some appropriate time (before, during, or after the luminescent printing operation). Preferably, however, a solvent etching pretreatment, prior to luminescent printing, is applied to a wide area, including those areas selected to receive the luminescent printing, as well as the background areas.

Accordingly, prior to luminescent spot printing, card 30 is passed between a pair of rollers 38 and 40, as indicated by arrow 36 in FIG. 2B. The latter roller is in contact with a bath of solvent material 42 contained within a vat 44. Suitable PVC solvents which can be used for this purpose are methyl ethyl ketone (MEK), tetrahydrofuran (THF), or similar volatile organic liquids.

As the credit card 30 passes between the rollers 38 and 40, both rollers rotate, and roller 40, which is porous, picks up the solvent material 42 and applies a small amount of it to the lower surface of the credit card 30, which results in a slight etching of that surface. Since the solvent is relatively volatile, and only a small amount is applied to the surface of the credit card, only a surface layer of the card material is attacked.

After this solvent etching pre-treatment illustrated in FIG. 2B, the underside of the credit card 30 has the appearance illustrated in FIG. 2C, when illuminated by visible light. The surface of the card is seen to have a uniform matte finish, such that a ray of visible light incident along a path 46 is reflected diffusely from the surface along a plurality of paths 48 and 50.

After a delay of only about one second, the volatile solvent 42 employed for the etching step of FIG. 2B has evaporated sufficiently so that at least a surface layer of the underside of the credit card 30 has dried to a condition of sufficient mechanical strength to withstand the luminescent spot printing step illustrated in FIG. 2D. This step employs a dual density foam applicator comprising an upper foam body 54 of relatively low density and a lower foam body 56 of relatively high density, which is directly in contact with foam body 54. The upper foam body 54 acts as a reservoir for a marking preparation comprising a conventional luminescent marking material, such as Tinopol SFG (Geigy Chemical Corp.) dissolved in any suitable volatile organic solvent, with solute concentration ranging up to about 1%. The preferred preparation employs MEK or THF as the solvent, and a solute concentration of about 0.2%. Preferably the solvent chosen is the same one used in the pre-treatment bath 42 of FIG. 2B, for uniformity of etching effect. Both MEK and THF are sufficiently volatile to evaporate quickly at the conclusion of the printing operation, so that the luminescent material which is printed on a typical spot 58 on the surface of the credit card 30 dries quickly and is fixed to the surface thereof. This avoids smudging and spreading of the luminescent spots, which would interfere with the reading precision of an automatic verifier device.

The marker preparation stored in the low density foam material 54 is drawn by capillary action into the higher density foam material 56, which repeatedly transfers the marker preparation to the surface of the credit card 30 during a succession of downward printing strokes (arrow 60) of the applicator 54, 56. A cover plate 62 is normally in place over the foam bodies 54 and 56 to prevent excessive evaporation of the solvent, but swings downwardly to its dashed line position, as indicated by arrow 64, to expose the foam body 56 during each printing stroke.

As previously noted, the problem arises as a result of the fact that the liquid which is employed as a solvent for the luminescent marker material, e.g. MEK or THF, is also a solvent for the PVC or other plastic credit card material, and therefore produces local etching at each luminescent-printed spot 58. The local etching, however, is now unable to distinguish spot 58 from the surrounding background area 66 of the underside of the credit card 30, because the latter is already etched. As a result, after the luminescent printing operation of FIG. 2D is performed, and regardless of how many luminescent coded spots 58 are so printed, the underside of the credit card 30 has the uniform matte finish illustrated in FIG. 2E, when illuminated by visible light. Consequently, it is impossible to determine, under such illumination, where the luminescent spots are located, or indeed if there are any such spots at all on the credit card 30. Note that the uniform matte finish of the printed credit card 30 as seen in FIG. 2E is indistinguishable from the appearance of the same credit card in FIG. 2C, prior to luminescent printing. (Compare, also, the appearance of the credit card 30 in FIG. 2E, which is printed according to the teachings of this invention, with that of the prior art luminescent-printed credit card of FIG. 3, which reveals the presence and location of each luminescent spot 14 printed thereon, even under visible light illumination.) Under ultra-violet light, however, as seen in FIG. 2F, every luminescent code spot 58 which has been printed on the underside of the credit card 30 is immediately visible against the unprinted background area 66. Thus, the ideal situation has been achieved, in which the code spots 58 stand out readily against the background area 66 when viewed under ultra-violet light, but blend completely into the matte finished background area 66 when viewed under visible light.

Plastic credit mards may also be supplied by the manufacturer with a surface finish which is not highly polished, but instead has a slight surface roughness giving it a somewhat duller light reflection characteristic. It is nevertheless preferable for luminescent spot-coded credit cards of this type to be pre-treated by solvent etching, in accordance with this invention, for two reasons.

The first reason is that, even if the surface finish of the card is not highly reflective, it is still substantially more reflective than the same surface will be after etching by luminescent marker solvent. Therefore, after luminescent printing is completed, the printed spots will be quite clearly distinguishable to the eye under ordinary visible light, even though the contrast relative to the background is not as great in this instance as it is with a very glossy credit card of the type discussed above. Consequently, pre-treatment is recommended in order to make the reflection characteristic of the background areas sufficiently diffuse to produce a good visual match between the printed and background areas.

The second reason relates to the underlying reason for employing a solvent-borne luminescent printing approach for credit card coding. Earlier in this patent application it was stated that one significant advantage of this technique is that the luminescent marker solvent, since it is also a PVC solvent, causes the luminescent marker material to penetrate below the surface of the credit card, thus making it more difficult for anyone to alter the card. This is true of any plastic credit card which is imprinted by a solvent process, even if pre-treatment in accordance with this invention is not employed. It has been discovered, however, that when the solvent etching form of pre-treatment taught herein is employed, the effect of the two successive solvent operations (i.e. etching and printing) is to increase the penetration of the luminescent marker material into the depth of the credit card to a surprising extent.

Apparently, the marker-free solvent treatment softens the credit card material to a substantial depth below the surface, and keeps it in a relatively softened and therefore more absorbent condition at a sub-surface level, even after the outer surface has undergone drying for about one second, and is ready for the luminescent marker printing operation. Then, during that printing operation, apparently the marker-bearing solvent cuts rapidly through the dry surface layer, and readily enters the softer, more porous sub-surface layer, thus delivering the luminescent marker material to a substantially greater depth then could have been achieved by a single solvent-borne luminescent marker printing operation. The resulting luminescent-printed credit card is substantially more secure against surface alteration than credit cards prepared according to prior art luminescent printing processes.

Since the foregoing description and drawings are merely illustrative, the scope of protection of the invention has been more broadly stated in the following claim; and it should be liberally interpreted so as to obtain the benefit of all equivalents to which the invention is farily entitled.

The embodiments of the invention in which an exclusive property or privilege is claimed are defined as follows:

1. A method of encoding a glossy surfaced plastic credit card with a plurality of selectively located spots that are substantially undetectable under normal visible light: comprising the steps of
   treating the entire surface area of the plastic card on which said spots are to be printed with a solvent such that said surface area is etched so as to have a matte finish; and
   printing one or more code spots on said etched surface area with a luminescent marking material dissolved in a solvent which is also a solvent for the material etched surface of the plastic whereby the surface of said printed spots will have substantially the same light reflective characteristics as that for the remaining etched surface under normal visible light.

References Cited

UNITED STATES PATENTS

| | | | |
|---|---|---|---|
| 3,455,577 | 7/1969 | Kikumoto | 283—6 |
| 3,477,156 | 11/1969 | Naito | 283—6 |
| 3,516,177 | 6/1970 | Skinner | 117—1.7 |
| 3,508,344 | 4/1970 | Thomas | 117—1.7 |

FOREIGN PATENTS

| | | | |
|---|---|---|---|
| 440,926 | 4/1934 | Great Britain | 117—47 |

WILLIAM D. MARTIN, Primary Examiner

W. R. TRENOR, Assistant Examiner

U.S. Cl. X.R.

40—2.2; 117—1.7, 15, 38, 47 A, 63, 64 R, 159